(12) United States Patent
Loh et al.

(10) Patent No.: US 9,086,054 B2
(45) Date of Patent: Jul. 21, 2015

(54) WIND TURBINE ROTOR BLADE

(75) Inventors: Wuh Ken Loh, Singapore (SG); Ying Ning, Singapore (SG)

(73) Assignee: Vestas Wind Systems, A/S, Aarhus N. (DK)

(*) Notice: Subject to any disclaimer, the term of this patent is extended or adjusted under 35 U.S.C. 154(b) by 578 days.

(21) Appl. No.: 13/392,264

(22) PCT Filed: Sep. 9, 2010

(86) PCT No.: PCT/EP2010/063258
§ 371 (c)(1),
(2), (4) Date: Mar. 16, 2012

(87) PCT Pub. No.: WO2011/029882
PCT Pub. Date: Mar. 17, 2011

(65) Prior Publication Data
US 2012/0169060 A1  Jul. 5, 2012

(30) Foreign Application Priority Data
Sep. 9, 2009  (GB) .................................. 0915777.7

(51) Int. Cl.
F03D 11/00 (2006.01)
F03D 1/06 (2006.01)
F03D 7/02 (2006.01)

(52) U.S. Cl.
CPC ............ *F03D 1/0683* (2013.01); *F03D 1/0641* (2013.01); *F03D 7/0232* (2013.01); *F05B 2240/31* (2013.01); *F05B 2240/311* (2013.01); *Y02E 10/721* (2013.01); *Y02E 10/723* (2013.01)

(58) Field of Classification Search
USPC ...... 416/23, 62, 72, 74, 88, 89, 132 B, 223 R, 416/228
See application file for complete search history.

(56) References Cited

U.S. PATENT DOCUMENTS 2,333,482 A * 11/1943 Littman ...................... 244/90 R
6,213,433 B1 * 4/2001 Gruensfelder et al. ....... 244/219
(Continued)

FOREIGN PATENT DOCUMENTS

DE   10 2006 036 389   2/2008
GB      2 332 894       7/1999
(Continued)

OTHER PUBLICATIONS

Agnes Wittmann-Regis; International Preliminary Report on Patentability issued in priority International Application No. PCT/EP2010/063258; Mar. 13, 2012; 8 pages; The International Bureau of WIPO.
(Continued)

*Primary Examiner* — Edward Look
*Assistant Examiner* — Aaron R Eastman
(74) *Attorney, Agent, or Firm* — Wood, Herron & Evans, LLP

(57) ABSTRACT

A wind turbine blade is described, which extends in a spanwise direction from a root end to a tip end and defines an aerodynamic airfoil cross-section between a leading edge and a trailing edge in a chordwise direction transverse to the spanwise direction. The blade has a camber in the chordwise direction and includes a blade body and a moveable flap. The flap is moveable relative to the blade body to vary the camber of the blade. A deformable panel is located between the blade body and the moveable flap. The panel has an undulating profile comprising an alternating succession of ridges and troughs, which each extend in a first direction. The panel is formed of a material having anisotropic intrinsic stiffness with maximum anisotropic intrinsic stiffness being transverse to the first direction. In a preferred embodiment, the deformable panel is corrugated.

22 Claims, 4 Drawing Sheets

(56) References Cited

U.S. PATENT DOCUMENTS

| | | | |
|---|---|---|---|
| 6,474,945 B1* | 11/2002 | Nakasato et al. | 416/23 |
| 2006/0145031 A1* | 7/2006 | Ishikawa et al. | 244/219 |
| 2006/0163431 A1* | 7/2006 | Dittrich | 244/126 |
| 2007/0036653 A1* | 2/2007 | Bak et al. | 416/98 |
| 2008/0187442 A1* | 8/2008 | Standish et al. | 416/235 |

FOREIGN PATENT DOCUMENTS

| | | |
|---|---|---|
| JP | 2006-248456 | 9/2006 |
| WO | 2004/088130 | 10/2004 |
| WO | 2008/131800 | 11/2008 |
| WO | 2009/061478 | 5/2009 |
| WO | 2009/095758 | 8/2009 |

OTHER PUBLICATIONS

James Paddock; Search Report issued in priority Great Britain Application No. GB0915777.7; Jan. 22, 2010; 4 pages; Great Britain Intellectual Property Office.

James Paddock; Examination Report issued in priority Great Britain Application No. GB0915777.7; Nov. 17, 2011; 3 pages; Great Britain Intellectual Property Office.

David Biloen; International Search Report and Written Opinion issued in priority International Application No. PCT/EP2010/063258; Sep. 9, 2011; 11 pages; European Patent Office.

C. Thill et al.; Morphing Skins; The Aeronautical Journal; Mar. 2008; 24 pages; Department of Aerospace Engineering, University of Bristol, United Kingdom.

* cited by examiner

WIND TURBINE ROTOR BLADE

TECHNICAL FIELD

The present invention relates to a wind turbine rotor blade. In particular it relates to a wind turbine blade having means for modifying the camber of the blade in order to regulate loads acting on the wind turbine rotor.

BACKGROUND

The mean camber line of an airfoil section is the curvature defined by a line halfway between the upper and lower surfaces of the airfoil section. The camber of an airfoil section affects air flow over the airfoil and therefore affects the lift generated by the airfoil.

It is known to regulate the loads acting on the blades of a wind turbine rotor with devices that modify the camber of the blades. Such devices include adjustable flaps, for example trailing edge flaps, leading edge flaps, ailerons, slats and Gurney flaps. In general, these flaps are supported by bearings that facilitate relative movement between the flaps and the body of the blade. In such hinged flaps, the bearings tend to be the main failure point due to mechanical wear and tear. Aside from wear and tear, a disadvantage of hinged flaps is that they often disrupt the otherwise continuous surface of the blade, which can cause aerodynamic noise and excessive drag, and reduce the efficiency of the wind turbine. A further disadvantage of hinged flaps is that the gap between the flap and the blade body may expose components inside the blade to environmental attack. For example, moisture or debris may enter the blade through the gap and damage the actuation mechanism of the flap, particularly if that water forms ice inside the blade.

Aside from hinged flaps, it is also known to modify the shape of blades by incorporating deformable parts into the structure of the blades. For example, WO2004/088130 discloses a wind turbine blade having a deformable trailing edge portion made from elastic material such as rubber. The trailing edge portion is configured to deform or flex without disrupting the continuity of the outer surface of the blade.

A deformable trailing edge portion of a wind turbine blade may be required to move or flex over a large range and at high frequencies. For example, known trailing edge portions may be required to flex at a frequency of approximately 1 Hz over a 20 degree range, and at a frequency of approximately 10 Hz over a 5 degree range. In many systems, to facilitate this level of flexing, the deformable trailing edge portion must be capable of extending and compressing by several millimeters. This large-range high-frequency flexing often causes fatigue in the deformable materials of known systems.

Aside from wind turbines, deformable portions are also known in aircraft wings. For example, US 2006/0145031 describes an aircraft wing formed from corrugated carbon fibre reinforced plastic (CFRP) plates. The wing extends from root to tip in a wing span or "spanwise" direction, and extends transversely from a leading edge to a trailing edge in a wing chord or "chordwise" direction. The corrugations in the CFRP plates increase the bending flexibility of the wing in the chordwise direction. The elastic action of the corrugations increases the compressive strength of the wing and prevents the wing from buckling when flexing. In one embodiment (FIG. 11), elastic material is impregnated into the concave "valley" portions of the corrugations. The elastic material fills the valleys and results in a smooth aerodynamic external surface of the wing. The elastic action of the elastic material also serves to increase the compressive strength of the wing in the corrugated region and hence permits a greater range of flexing of the wing in the corrugated region without buckling. In another embodiment (FIG. 13), a layer of elastic material is applied on top of the CFRP plates to achieve a smooth aerodynamic surface whilst enclosing air in the valleys of the corrugations. The elastic material and the compressibility of the air in the valleys together serve to increase the compressive strength of the wing in the corrugated region and allow the wing to flex over a greater range without buckling. In each of the embodiments described in US 2006/0145031, stiffness in the wing span direction is maximised by arranging the CFRP plates so that the reinforcing carbon fibres are aligned unidirectionally in the wing span direction.

Known flap systems are generally expensive, and may be relatively complicated to manufacture and/or attach to the blade. In addition, known systems often suffer from poor mechanical stability. Furthermore, most known systems rely on elastic materials such as rubber to provide flexibility. However, rubber generally has a short lifetime, especially when exposed to sunshine or extremes of weather. Consequently, known systems may have a short service life and may require frequent replacement.

Against this background, the present invention aims to provide an improved system for changing the profile that defines the camber of a wind turbine blade, which is relatively inexpensive and simple to manufacture, and which has a relatively long service life.

SUMMARY OF THE INVENTION

According to a first aspect of the present invention, there is provided a wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
 a blade body;
 a flap moveable relative to the blade body for varying the camber of the blade; and
 a deformable panel between the blade body and the moveable flap, the panel having an undulating profile comprising an alternating succession of ridges and troughs, the ridges and troughs each extending in a first direction, wherein the panel is formed of a material having anisotropic intrinsic stiffness with maximum anisotropic intrinsic stiffness being transverse to the first direction.

The undulating profile increases the bending flexibility (i.e. reduces the stiffness) of the deformable panel perpendicular to the first direction and allows the flap to move easily relative to the blade body. Consequently, the driving force required to move the flap is reduced relative to many known deformable systems. The reduced stiffness perpendicular to the first direction is compensated for by ensuring that the material from which the panel is made has maximum anisotropic intrinsic stiffness transverse to the first direction; this prevents the undulating panel sagging in use, as described in more detail later. The deformable panel obviates the need for bearings, which as mentioned above are the main failure point of hinged flaps.

The maximum anisotropic intrinsic stiffness of the material from which the panel is formed may be substantially perpendicular to the first direction. In a preferred embodiment, the ridges and troughs each extend substantially in the spanwise direction. Hence, in this embodiment, the material from which the panel is formed has maximum anisotropic intrinsic stiffness transverse to the spanwise direction. Preferably, the material has maximum anisotropic intrinsic stiffness substantially in the chordwise direction.

Movement of the flap may be driven by any suitable actuating means known in the art, for example a linear motor, pneumatic system or piezoelectric actuator.

The deformable panel may be provided on one side of the blade, whilst a sliding arrangement between the flap and the blade body may be provided on the other side of the blade. In one embodiment of the invention, a deformable panel is provided on the suction side of the blade, whilst a sliding joint is provided on the pressure side. The sliding joint may be provided by an extension portion of the trailing edge flap that extends slidably into an interior region of the blade body. The extension portion may be a section of the "skin" (i.e. the outermost structural layer(s)) of the trailing edge flap. In other embodiments, the deformable panel may be provided on the pressure side and a sliding joint may be provided on the suction side.

In one embodiment of the invention, multiple deformable panels are employed between the flap and the blade body. For example, upper and lower deformable panels may be provided on the suction and pressure sides of the blade respectively between the flap and the blade body. Whilst the following description refers to a deformable panel in the singular, it will be appreciated that the relevant teaching can be applied to embodiments having more than one such deformable panel.

In a preferred embodiment of the invention, the deformable panel is corrugated. In this embodiment, successive corrugations form the alternating succession of ridges and troughs defined above. For the purposes of the following description, a direction of undulation (or 'undulating direction') is defined herein as a direction in the plane of the panel perpendicular to the first direction (i.e. perpendicular to the direction in which the ridges and troughs extend). For the preferred embodiment, the undulating direction is referred to as the direction of corrugation or 'corrugation direction'. Preferably, the maximum anisotropic intrinsic stiffness of the material from which the or each panel is formed is substantially parallel to the undulating or corrugation direction (i.e. the intrinsic Young's modulus of the panel material is preferably at a maximum in or close to the undulating or corrugation direction).

The corrugations define undulations (ridges and troughs) on both surfaces of the panel and hence maximise the flexibility of the deformable panel. The corrugated structure can withstand high speed and cyclic operation, and provides a long service life: the deformable system is expected to last for twenty years before replacement is required.

It will be appreciated that in other embodiments of the invention, the panel(s) may not be corrugated. For example, the undulating profile could be formed by removing sections of the panel material to form a succession of substantially parallel slots, grooves, furrows or such like (i.e. the troughs defined above), which extend in the first direction. Alternatively, an undulating profile could be formed without removing material: for example, by cutting slits in the panel. Further, it will be appreciated that the undulations may be provided on one or both surfaces of the deformable panel although undulations on both surfaces are preferred.

The deformable panel preferably forms part of the structure of the wind turbine blade. The panel may form part of the skin of the blade. For example, the skin of a blade may surround a blade interior that is hollow and/or contains supporting spars or other structures or components. In this respect, the panel may be regarded as a deformable skin portion. The panel may be integrally formed with the skin that covers the blade body and the trailing edge flap. The panel preferably joins the flap to the blade body and assists in supporting the flap in a desired orientation with respect to the blade body. The flap may primarily be supported relative to the blade body by a suitable load-bearing structure such as a shaft extending inside the blade between the flap and the blade body.

As the skin of a wind turbine blade is typically made of fibre-reinforced materials, conveniently the panel may also be formed of fibre-reinforced materials. Suitable materials include carbon-fibre reinforced plastic (CFRP), glass-fibre reinforced plastic (GFRP) and a para-aramid synthetic fiber (KEVLAR®) reinforced material. Preferably, the panel is formed of E-glass fibre reinforced epoxy (E-GFRE). The panel may be formed from several layers of fibre-reinforced plies. The plies may have reinforcing fibres that are aligned substantially unidirectionally such that the plies have anisotropic intrinsic stiffness: the Young's modulus of a ply is highest in the direction in which the fibres are aligned.

In preferred embodiments of the invention, the panel may be formed from several plies in which the majority of plies are arranged with the unidirectional fibre direction substantially perpendicular to the first direction. This ensures that the panel has maximum anisotropic intrinsic stiffness substantially perpendicular to the first direction. However, the panel may also include plies arranged such that the fibres extend in other directions, for example at +/−45 degrees to the first direction to ensure that the panel has sufficient stiffness in other directions. For example, the panel may be formed of multiple plies in which the majority of plies are arranged such that the fibres extend substantially unidirectionally parallel to the corrugation direction, whilst a few plies may be arranged with the fibres extending in other directions, say at +/−45 degrees to the corrugation direction. In this example, the resulting panel would have maximum anisotropic intrinsic stiffness in the corrugation direction whilst also retaining sufficient strength in other directions, for example in the spanwise direction of the blade.

To manufacture the panels, the plies may be arranged in an undulating mould (a corrugated mould is used to manufacture the preferred embodiment), with the majority of plies being arranged such that the reinforcing fibres extend parallel to the undulating or corrugation direction (i.e. substantially perpendicular to the first direction).

The reduced stiffness of the deformable panel, which results from the undulations (or corrugations in the preferred embodiment), could leave the panel susceptible to sagging under high-pressure loads experienced by the wind turbine blade in use. These loads are typically in the region of 2000 to 4000 Pascals (Pa). Sagging is undesirable because the panel may be a structural component of the wind turbine blade (as mentioned above), and should therefore have sufficient rigidity to fulfil its structural role of joining the flap to the blade body despite the undulations or corrugations that assist flexing. In the present invention, sagging is prevented by virtue of the maximum anisotropic intrinsic stiffness of the panel material being transverse to the first direction. The resulting increased rigidity of the panel transverse to the first direction compensates for the reduced rigidity (increased flexibility) in this direction resulting from the undulation or corrugations. Utilising the anisotropic properties of the panel material in this way to maximise the intrinsic stiffness of the panel material transverse to the first direction can allow just a single layer of material to be used to form the panel. For example, a single layer of corrugated E-GFRE (preferably formed from multiple plies of E-glass fibres) with sufficient E-glass fibres arranged substantially in the corrugation direction can withstand loads of 2000-4000 Pa without appreciable sagging.

Advantageously, further structural or load-bearing layers or materials may not be required to compensate for the reduced stiffness resulting from the corrugations/undulations. For example, a single layer of E-GFRE is able to flex over a large range with low strain, thus extending the fatigue life of the panel.

In a preferred embodiment of the invention, the moveable flap is a trailing edge flap. In this embodiment, the first direction is substantially parallel to the spanwise direction of the blade, i.e. the ridges and troughs of the panel extend in the spanwise direction. Hence, the direction of undulation or corrugation is in the chordwise direction of the blade. The undulations/corrugations serve to increase the flexibility of the blade in the localised region between the blade body and the trailing edge flap (the junction region) so that the trailing edge flap can move or deflect relative to the blade body. Movement of the trailing edge flap is substantially in a flapwise direction, i.e. transverse to both the chordwise direction and the longitudinal direction, to vary the camber of the blade. The undulations/corrugations ensure that the panel is flexible in the chordwise direction, and yet is stiff in the spanwise direction of the blade. To prevent the panel from sagging as mentioned above, the maximum anisotropic intrinsic stiffness of the panel material is transverse to the spanwise direction. Optimally, the maximum anisotropic intrinsic stiffness of the panel material is substantially in the chordwise direction of the blade. To this end, in a preferred embodiment, at least one ply is arranged such that the reinforcing fibres are aligned substantially unidirectionally in the chordwise direction of the blade. Preferably multiple plies are arranged with their fibres extending substantially unidirectionally in the chordwise direction. Notably, this is in contrast to the embodiments described in US 2006/0145031, in which the reinforcing fibres are aligned in the spanwise direction and increased chordwise stiffness is achieved by providing an additional structural layer (of CFRP or rubber) over the corrugations.

The panel defines a "junction region" or region of localised flexibility between the blade body and the flap. The deformable panel may be bonded to the blade body by adhesive. The deformable panel may also be bonded to the flap by adhesive. Preferably, the panel is bonded to both the blade body and to the flap by adhesive. The use of adhesive to bond the flap to the blade body is an inexpensive solution that simplifies blade manufacture. This is in contrast to known systems, which typically employ relatively complicated and expensive means of attaching the flap to the blade. Consequently, the present invention provides a more compact and cheaper solution than known systems.

In embodiments where the flap is a trailing edge flap, the deformable panel may have a chord length of approximately 10 to 15% of the chord length of the blade whilst the trailing edge flap may have a chord length of approximately 10 to 25% of the chord length of the blade. Preferably, the flap is rigid. This is in contrast to many known deformable systems in which the flap itself is made from deformable material and constitutes a greater percentage of the chord length of the blade than the deformable panel of the present invention.

By providing a deformable panel between the flap and the blade body, the present invention allows the size of the deformable region to be minimised, so that the overall structure of the blade is not adversely affected by the localised flexibility. Also, the present invention allows the flap to be manufactured separately from the panel, so that the choice of materials for the flap is not dependent on the choice of materials for the panel. However, it is presently preferred that the flap is also made from E-GFRP. It will however be appreciated that the flap and the deformable panel could be integrally formed. Whilst the undulations/corrugations are preferably only in a region between the flap and the blade body, embodiments of the invention are envisaged in which the undulations/corrugations could extend into the flap.

It will be appreciated that the flap need not extend along the entire spanwise length of the blade, but may occupy only a portion of the trailing edge. It will also be appreciated that a plurality of similar flaps could be provided in the spanwise direction of the blade, each flap being coupled to the blade body by one or more deformable panels. Whilst trailing edge flaps have been described above, it will be appreciated that deformable panels could be used to attach other types of flaps to a blade, for example leading edge flaps.

A shroud or cover may be provided over the undulating or corrugated panel (i.e. over the junction region) to achieve a smooth, aerodynamic outer surface of the wind turbine blade. The shroud is preferably a thin layer of elastic material such as silicone rubber or EDPM rubber (ethylene propylene diene Monomer (M-class)), which may be around 2 mm thick.

The shroud may be attached along a first edge to the blade body, and along a second edge to the flap. Conveniently, the shroud may be bonded to the blade using adhesive. The shroud may be stretched over the junction region. The elastic action of the shroud allows a smooth transition of the airfoil profile when the flap is moved, which results in improved aerodynamic performance compared to conventional hinged flaps.

As rubber materials generally have a short lifetime, the shroud may require replacement at regular service intervals. Preferably, the shroud is independent from the panel. This allows the shroud to be removed and replaced without having to remove or replace the panel. Preferably, the shroud does not attach to the ridges and troughs of the panel. This ensures that the shroud does not restrict the ability of the panel to flex. Conveniently, replacement of the shroud does not require removal or replacement of the flap. As the shroud is independent from the other components of the deformable system, the rubber material of the shroud does not shorten the service life of the flap or deformable panel. This is in contrast to the known systems described above, in which rubber materials are used to form the flaps or are incorporated inseparably into the deformable structure, thereby shortening the service life of the entire deformable system.

Advantageously, the shroud may form a seal over the junction region to protect components inside the blade from environmental attack. For example, the seal prevents water from entering the blade and forming ice which can damage the actuators of the moveable flap.

In contrast to the known systems described by way of background, the shroud is substantially non-structural. Hence, according to a second aspect of the present invention, there is provided a wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
  a blade body;
  a flap moveable relative to the blade body for varying the camber of the blade;
  a structural deformable panel in a junction region between the blade body and the moveable flap, the panel having an undulating profile; and
a substantially non-structural shroud covering the undulating profile of the deformable panel to define a smooth external surface of the blade.

It will be appreciated that advantageous, preferred and/or optional features described above in relation to the first aspect of the invention are equally applicable to the second aspect of the invention.

The invention may be embodied in a wind turbine generator. Preferably, the wind turbine generator is a horizontal axis wind turbine generator.

BRIEF DESCRIPTION OF THE DRAWINGS

In order that the invention may be more readily understood, reference will now be made, by way of example, to the following figures, in which:

FIG. 1b is an enlarged cross-sectional view of the moveable trailing edge flap of FIG. 1a;

DETAILED DESCRIPTION

Figure 1A:
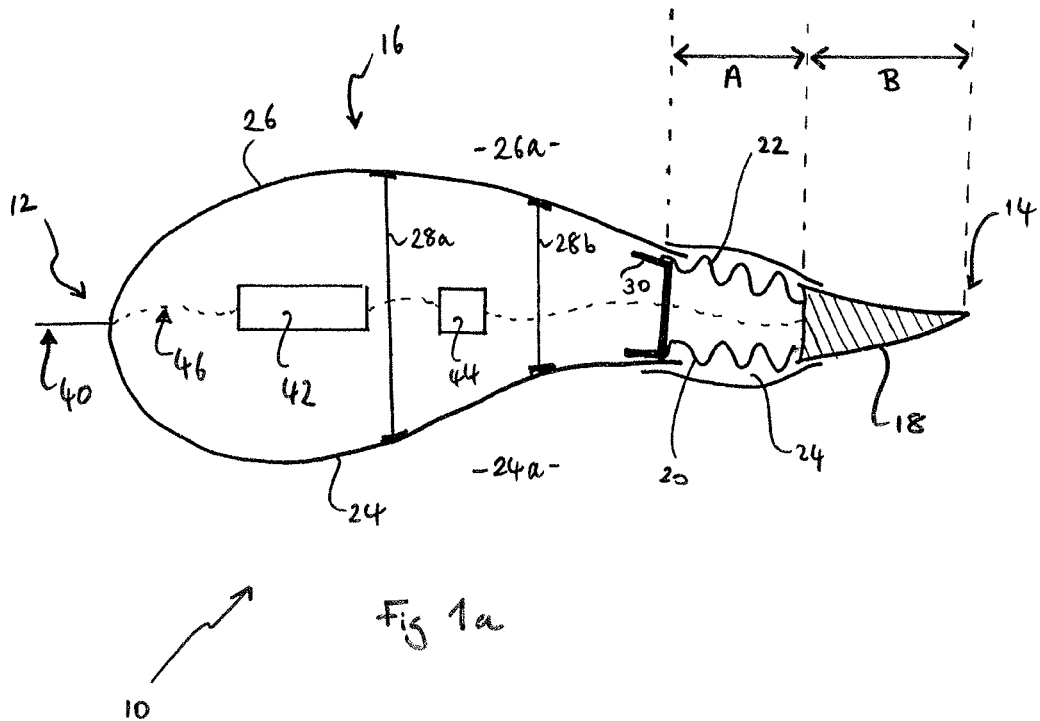
FIG. 1a shows a cross-section of a wind turbine blade having a moveable trailing edge flap in accordance with a first embodiment of the present invention.

FIG. 1a shows an aerodynamic airfoil cross-section of a wind turbine blade in accordance with a first embodiment of the present invention. The blade section 10 extends in a chordwise direction from a leading edge 12 to a trailing edge 14, and has a camber in the chordwise direction. The leading edge 12 is defined by a blade body 16, and the trailing edge 14 is defined by a trailing edge flap 18. The trailing edge flap 18 is attached to the blade body 16 via first and second deformable panels 20, 22 in a junction region 24 of the blade 10. The deformable panels 20, 22 each have a chord length of approximately 10% of the chord length of the blade (as shown by arrow A) whilst the trailing edge flap 18 has a chord length of approximately 20% of the chord length of the blade 10 (arrow B).

The blade body 16 is manufactured from first and second half shells 24, 26 of E-glass fibre reinforced epoxy resin (E-GFRP), which are joined together substantially at the leading edge 12 of the blade 10. The first half shell 24 forms a pressure side 24a of the blade 10 (the lower surface of the blade as shown on the page), whilst the second half shell 26 forms a suction side 26a of the blade 10 (the upper surface of the blade as shown on the page). The composite half shells 24, 26 are supported by spar webs 28a, 28b that extend in the spanwise direction. A C-channel web 30, which also extends in the spanwise direction, is located at the trailing edge end of the blade body 16. In addition to maintaining the structural integrity of the blade 10, the C-channel web 30 assists in joining the deformable panels 20, 22 to the blade 10 by constraining deformation of the adhesive joints between the blade body 16 and the panels 20, 22, which are subject to peel loading.

In this example, the trailing edge flap 18 is rigid and made from E-GFRE. The flap 18 is coupled to the first half shell 24 on the pressure side 24a of the blade 10 by the first deformable panel 20. The second deformable panel 22 is used to couple the flap 18 to the second half shell 26 on the suction side 26a of the blade 10. The first and second deformable panels 20, 22 are attached to the first and second half shells 24, 26 respectively using an adhesive such as epoxy or polyurethane (PUR); adhesive is also used to attach the panels 20, 22 to the trailing edge flap 18.

Figure 1B:
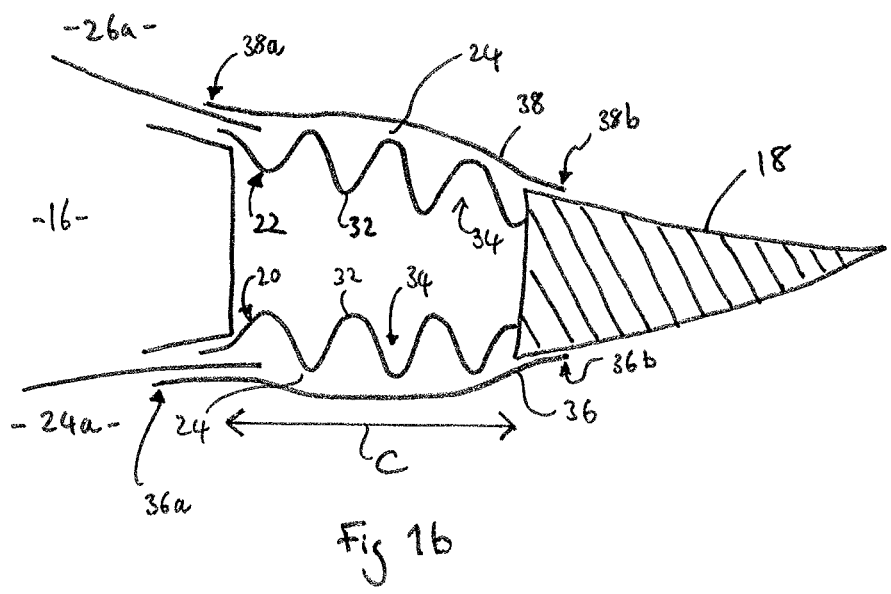

As shown in FIG. 1b, each panel 20, 22 is corrugated such that an alternating succession of ridges 32 and troughs 34 extend longitudinally in the spanwise direction of the blade 10 (the spanwise direction is perpendicular to the plane of the page in the orientation shown in FIGS. 1a and 1b). The longitudinal extension of the ridges 32 and troughs 34 can be seen in FIGS. 3a-3c. A corrugation direction is denoted in FIG. 1b by arrow C. The corrugation direction C is substantially parallel to the chordwise direction of the blade 10; in other words, the panels 20, 22 are corrugated in the chordwise direction. The corrugations (ridges 32 and troughs 34) serve to increase the bending flexibility of the panels 20, 22 in the chordwise direction, whilst also increasing the stiffness of the panels 20, 22 in the spanwise direction.

The first and second deformable panels 20, 22 are each made from a single layer of E-GFRE, which is formed from multiple layers of E-glass plies. Using just a single layer of material to form the panels 20, 22 is advantageous because it minimises the weight and thickness of the panels 20, 22, and maximises the bending flexibility of the panels 20, 22, thereby allowing the trailing edge flap 18 to deflect over a large range.

The E-glass plies of the E-GFRE are arranged such that the E-GFRE has anisotropic intrinsic stiffness. In this example, several plies with substantially unidirectional fibres are arranged such that the fibres of those plies extend transverse to the spanwise direction of the blade, and in fact are aligned substantially parallel to the corrugation direction C (and hence substantially parallel to the chordwise direction). In addition, a few plies are arranged with the fibres aligned at substantially +/−45 degrees to the corrugation C. Consequently, the Young's modulus of the E-GFRE is a maximum in the corrugation direction C, but the E-GFRE also has sufficient strength in other directions. Utilising the anisotropic intrinsic stiffness of the panel material in this way compensates for the reduced stiffness in the corrugation direction C caused by the corrugations, and thus substantially prevents the panels 20, 22 from sagging under the extreme pressure loads experienced by the blade 10 in use. Notably, by ensuring that sufficient fibres extend substantially in the corrugation direction C, the panels 20, 22 have sufficient stiffness in the chordwise direction to prevent sagging without any further structural or load-bearing layers being required in the deformable region.

The corrugated panels 20, 22 are covered in the junction region 24 to achieve a smooth and aerodynamically-efficient external surface of the blade 10. Specifically, a first shroud 36 is provided over the junction region 24 on the pressure side 24a of the blade 10, and a second shroud 38 is provided over the junction region 24 on the suction side 26a of the blade 10. Each shroud 36, 38 comprises a layer of silicone rubber, which is approximately two millimeters (2 mm) thick. The shrouds 36, 38 are stretched over the junction region 24, and each shroud 36, 38 is bonded along a first edge 36a, 38a to the blade body 16 and along a second edge 36b, 38b to the trailing edge flap 18. Synthetic electrometric adhesive may be used to bond the shrouds 36, 38 to the blade body 16 and to the flap 18. In addition to providing a smooth external profile, the shrouds 36, 38 form a seal over the junction region 24 and prevent moisture or debris from entering the blade 10. Notably, the shrouds 36, 38 are not load bearing and do not play a structural role.

Referring again to FIG. 1a, a pitot tube 40 for monitoring the local pressure, relative wind speed and angle of attack of the blade section 10 is provided at the leading edge 12 of the blade section 10. A controller 42 is provided within the blade section 10 for signal collection from the pitot tube 40. An actuator power control unit 44 provides power to actuators (not shown) for moving the trailing edge flap 18. The dotted line 46 in FIG. 1a represents a signal path between these components.

Figure 2A:
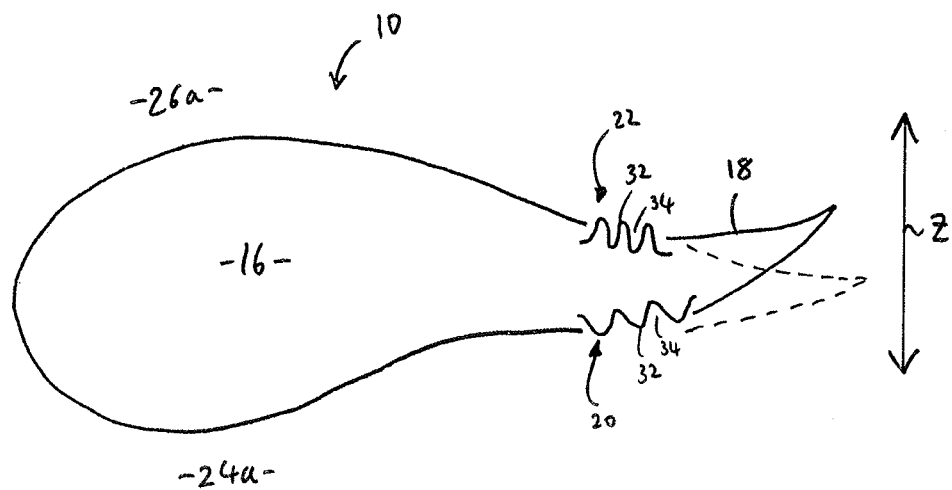
FIG. 2a shows a cross section of the wind turbine blade in a parked condition.
Figure 2B:
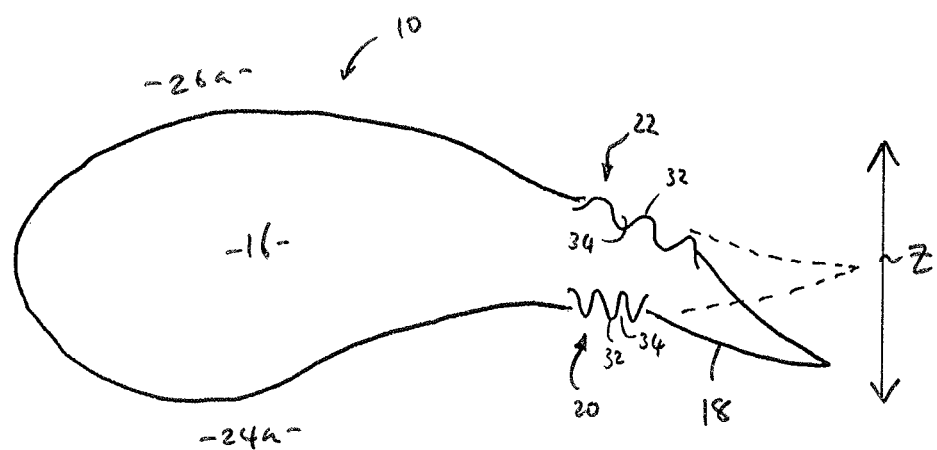
FIG. 2b shows a cross section of the wind turbine blade in a low speed condition.

FIGS. 2a and 2b show how the trailing edge flap is operated in use. Under the control of the controller 42 (FIG. 1a), the actuators (not shown) cause the trailing edge flap 18 to deflect relative to the blade body 16 in a flapwise direction Z, either upwards as shown by the solid line in FIG. 2a or downwards as shown by the solid line in FIG. 2b. The dotted lines in FIGS. 2a and 2b show the flap 18 in an intermediate position. When the wind turbine is in a parked condition, that is when the rotor is not turning (for instance due to high wind speed) the trailing edge flap 18 can be locked in an upwardly-deflected position as shown in FIG. 2a. By placing the trailing edge flap 18 in this position, the lift of the blade section 10 is reduced so that extreme loads acting on the turbine (for instance from gusts and high wind speed) are reduced.

At low wind speeds, it is desirable to increase the lift force generated from the blade 10 so that the rotor can start turning at a lower cut-in wind speed in order to increase the power production. FIG. 2b shows how the trailing edge flap 18 can be deflected downwardly to adjust the camber of the blade section 10 in order to obtain a high lift profile. This position of the trailing edge flap 18 decreases the cut-in wind speed and increases the power production. The trailing edge flap 18 may be locked in this downwardly-deflected position.

The corrugated panels 20, 22 are able to achieve high levels of extension and compression during flexing. Referring again to FIG. 2a, when the trailing edge flap 18 is upwardly deflected, the second corrugated panel 22 on the suction side 26a of the blade 10 compresses (i.e. the ridges 32 and troughs 34 narrow) whilst the first corrugated panel 20 on the pressure side 24a of the blade 10 extends (i.e. the ridges 32 and troughs 34 widen). Conversely, referring again to FIG. 2b, when the flap 18 is downwardly deflected, the second corrugated panel 22 on the suction side 36a of the blade 10 extends (i.e. the ridges 32 and troughs 34 widen) whilst the first corrugated panel 20 on the pressure side 24a of the blade 10 compresses (i.e. the ridges 32 and troughs 34 narrow).

Figure 3A:
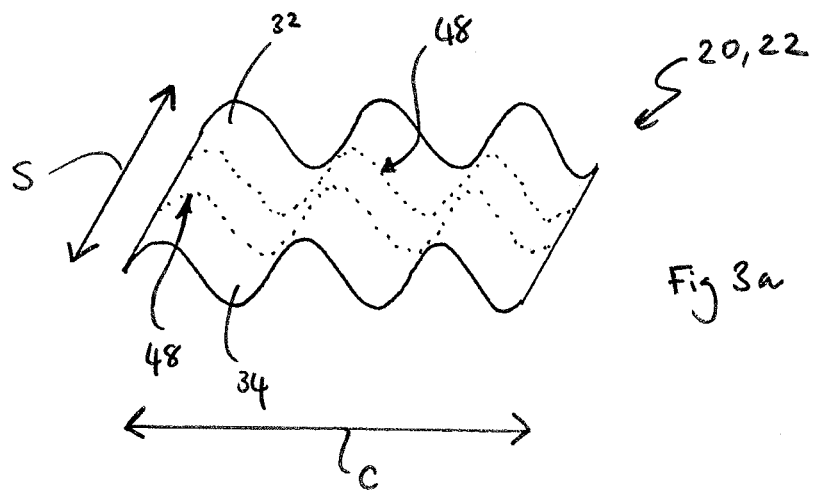
FIG. 3a is a perspective view of a deformable panel in a relaxed state.
Figure 3B:
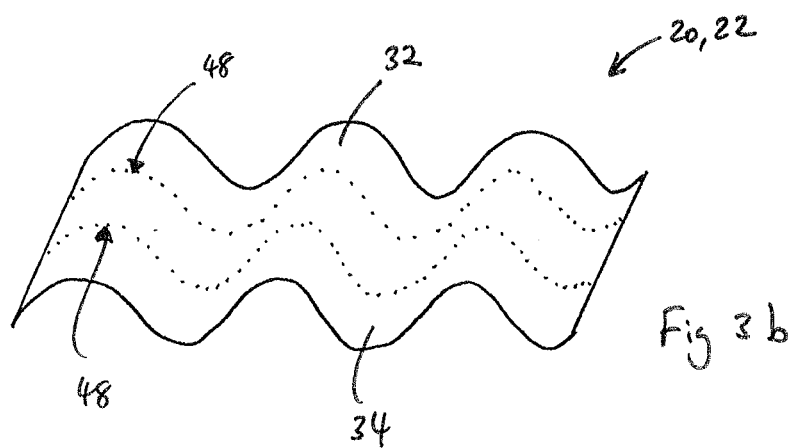
FIG. 3b shows the deformable panel in a stretched state.
Figure 3C:
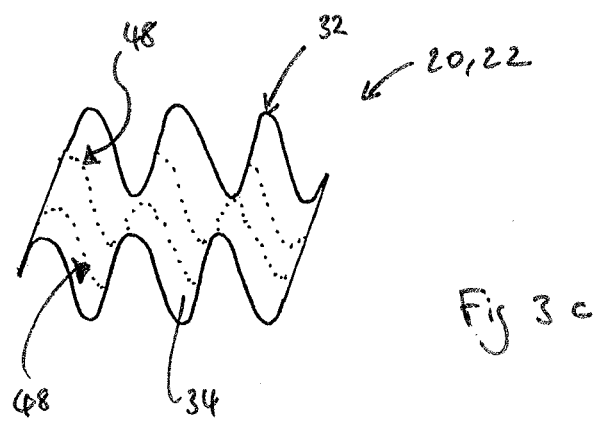
FIG. 3c shows the deformable panel in a compressed state.

Referring now to FIG. 3a, this shows a deformable panel 20, 22 in a relaxed, intermediate, or 'unflexed' state. As mentioned above, the longitudinal extension of the ridges 32 and troughs 34 in the spanwise direction S can be seen in FIG. 3a. The reinforcing fibres 48 that extend unidirectionally in the corrugation direction C are shown schematically by dotted lines in FIGS. 3a to 3c. As described above, when the trailing edge flap 18 (FIGS. 2a and 2b) is deflected, the deformable panel 20, 22 extends or compresses. Referring to FIG. 3b, the reinforcing fibres 48 are caused to straighten when the deformable panel 20, 22 extends. Conversely, as shown in FIG. 3c, the reinforcing fibres 48 are caused to fold when the deformable panel 20, 22 compresses. Importantly, the fibres 48 are not compressed or stretched when the flap 18 moves, but instead are folded or straightened. Consequently, the stress and strain on the fibres 48 is minimised. Reducing tensile and compressive loads on the reinforcing fibres 48 in this way minimises fibre breakage and hence increases the service life of the deformable panels and consequently of the entire deformable system. Aside from the fibres, the inherent elasticity of the panels 20, 22 resulting from the corrugations also prevents the resin of the panels from being subjected to excessive tensile and compressive loads.

Figure 4:
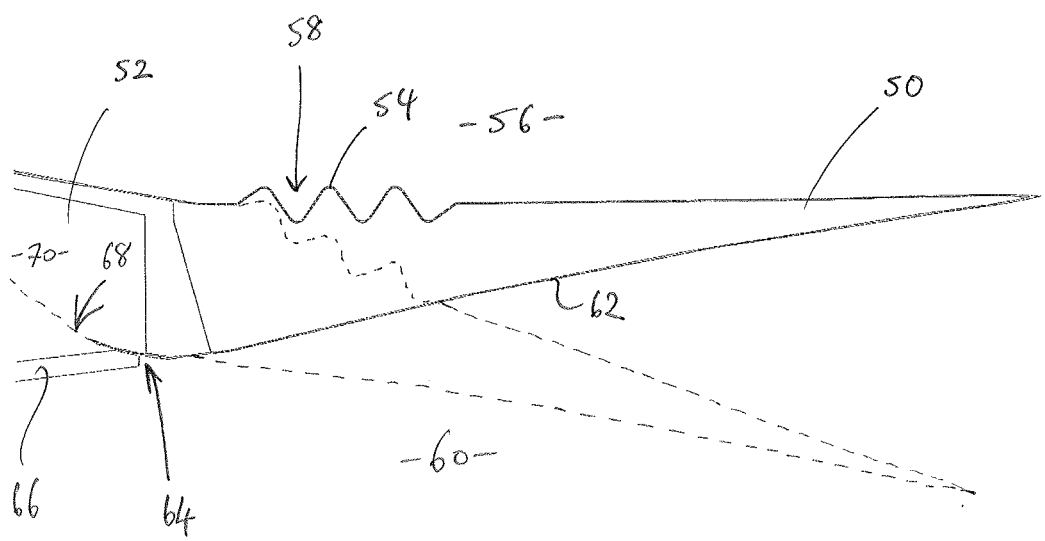
FIG. 4 shows the trailing edge flap of a wind turbine blade in accordance with a second embodiment of the present invention.

FIG. 4 shows a trailing edge flap 50 of a wind turbine blade in accordance with a second embodiment of the present invention. In this example, the trailing edge flap 50 is attached to a blade body 52 via a corrugated panel 54 on a suction side 56 of the blade at a junction region 58 between the blade body 52 and the trailing edge flap 50.

In contrast to the first embodiment, there is no corrugated panel on a pressure side 60 of the blade. Instead, the skin 62 on the pressure side 60 is broken at the junction region 58. A longitudinal gap 64 is defined in the pressure side 60 of a C-shaped web 66 between the blade body 52 and the trailing edge flap 50. An end portion 68 of the skin 62 on the pressure side 60 of the trailing edge flap 50 extends through the gap 64 into an internal region 70 of the blade body 52. This arrangement provides a sliding joint between the trailing edge flap 50 and the blade body 66 on the pressure side 60 of the blade.

The solid line in FIG. 4 represents the trailing edge flap 50 when deflected upwardly with respect to the blade body 52, whilst the dashed line represents the trailing edge flap 50 when deflected downwardly. As shown in FIG. 4, when the trailing edge flap 50 is deflected upwardly, the corrugated panel 54 on the suction side 56 is compressed and the end portion 68 of the skin 62 on the pressure side 60 extends slightly into the internal region 70 of the blade body 52 to support the trailing edge flap 50 in this position. When the trailing edge flap 50 is deflected downwardly, the corrugated panel 54 on the suction side 56 is extended and the end portion 68 of the skin 62 on the pressure side 60 extends further into the internal region 70 through the gap 64 in the C-shaped web 66.

Whilst corrugated panels have been described, it will be appreciated that undulations may be provided by techniques other than corrugation. For example, furrows or valleys could be formed in deformable panels by removing sections of material from the panels.

Also, whilst a trailing edge flap has been described specifically, it will be appreciated that the deformable panels could be employed in other deformable system, for example in leading edge flaps.

The invention claimed is:

1. A wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
   a blade body;
   a flap moveable relative to the blade body for varying the camber of the blade; and
   a deformable panel between the blade body and the moveable flap, the panel having an undulating profile comprising an alternating succession of ridges and troughs, the ridges and troughs each extending in a first direction, wherein the panel is formed of a material having anisotropic intrinsic stiffness with maximum anisotropic intrinsic stiffness being transverse to the first direction.

2. The wind turbine blade as claimed in claim 1, wherein the maximum anisotropic intrinsic stiffness of the material from which the panel is formed is substantially perpendicular to the first direction.

3. The wind turbine blade as claimed in claim 1, wherein the material from which the panel is formed has maximum anisotropic intrinsic stiffness substantially in the chordwise direction.

4. The wind turbine blade as claimed in claim 1, wherein the flap is a trailing edge flap.

5. The wind turbine blade as claimed in claim 1, wherein the panel is formed from fibre-reinforced material in which the majority of reinforcing fibres extend substantially transverse to the first direction.

6. The wind turbine blade as claimed in claim 5, wherein the ridges and troughs each extend substantially in the spanwise direction and the majority of reinforcing fibres extend substantially unidirectionally in the chordwise direction.

7. The wind turbine blade as claimed in claim 1, wherein the panel is formed from at least one ply of reinforcing fibres, the ply being arranged such that a majority of reinforcing fibres of the ply extend substantially transverse to the first direction.

8. The wind turbine blade as claimed in claim 7, wherein the ridges and troughs each extend substantially in the spanwise direction and the majority of reinforcing fibres of the ply extend substantially parallel to the chordwise direction.

9. The wind turbine blade as claimed in claim 1, wherein the panel is corrugated.

10. The wind turbine blade as claimed in claim 1, wherein the deformable panel connects the flap to the blade body.

11. The wind turbine blade as claimed in claim 10, wherein the panel is bonded to both the blade body and the flap by adhesive.

12. The wind turbine blade as claimed in claim 1, wherein the flap and the panel are integrally formed.

13. The wind turbine blade as claimed in claim 1, wherein the deformable panel has a chord length of 10 to 15% of the chord length of the blade.

14. The wind turbine blade as claimed in claim 1, wherein a shroud is provided over the deformable panel to form a substantially smooth profile at an external surface of the blade.

15. The wind turbine blade as claimed in claim 14, wherein the shroud is bonded to the blade.

16. The wind turbine blade as claimed in claim 15, wherein the shroud is attached along a first edge to the blade body and attached along a second edge to the flap.

17. The wind turbine blade as claimed in claim 14, wherein the shroud forms a seal over the deformable panel.

18. The wind turbine blade as claimed in claim 1, wherein a plurality of similar flaps are provided in the spanwise direction of the blade, each flap being coupled to the blade body by a deformable panel.

19. A wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
a blade body;
a flap moveable relative to the blade body for varying the camber of the blade; and
a deformable panel between the blade body and the moveable flap, the panel having an undulating profile comprising an alternating succession of ridges and troughs, the ridges and troughs each extending in a first direction, wherein the panel is formed of a material having anisotropic intrinsic stiffness with maximum anisotropic intrinsic stiffness being transverse to the first direction, and wherein the ridges and troughs each extend substantially in the spanwise direction and the material from which the panel is formed has maximum anisotropic intrinsic stiffness transverse to the spanwise direction.

20. A wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
a blade body;
a flap moveable relative to the blade body for varying the camber of the blade;
a structural deformable panel in a junction region between the blade body and the moveable flap, the panel having an undulating profile; and
a substantially non-structural shroud covering the undulating profile of the deformable panel to define a smooth external surface of the blade.

21. A wind turbine generator-comprising at least one wind turbine blade, the wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
a blade body;
a flap moveable relative to the blade body for varying the camber of the blade; and
a deformable panel between the blade body and the moveable flap, the panel having an undulating profile comprising an alternating succession of ridges and troughs, the ridges and troughs each extending in a first direction, wherein the panel is formed of a material having anisotropic intrinsic stiffness with maximum anisotropic intrinsic stiffness being transverse to the first direction.

22. A wind turbine generator comprising at least one wind turbine blade, the wind turbine blade extending in a spanwise direction from a root end to a tip end and defining an aerodynamic airfoil cross-section between a leading edge and a trailing edge in a chordwise direction transverse to the spanwise direction, the blade having a camber in the chordwise direction and comprising:
a blade body;
a flap moveable relative to the blade body for varying the camber of the blade;
a structural deformable panel in a junction region between the blade body and the moveable flap, the panel having an undulating profile; and
a substantially non-structural shroud covering the undulating profile of the deformable panel to define a smooth external surface of the blade.

\* \* \* \* \*